United States Patent [19]

Nakamichi

[11] Patent Number: 5,613,709
[45] Date of Patent: Mar. 25, 1997

[54] ROTATABLE STEERING GEAR BOX AND COLLAPSIBLE STEERING COLUMN

[75] Inventor: Hideaki Nakamichi, Saitama, Japan

[73] Assignee: Honda Giken Kogyo Kabushiki Kaisha, Tokyo, Japan

[21] Appl. No.: 523,184

[22] Filed: Sep. 5, 1995

[30] Foreign Application Priority Data

Sep. 5, 1994 [JP] Japan .................................. 6-211061
Oct. 20, 1994 [JP] Japan .................................. 6-255659

[51] Int. Cl.$^6$ .................................................. B62D 1/18
[52] U.S. Cl. .......................... 280/777; 180/232; 180/274; 74/492
[58] Field of Search .................................. 280/777, 779, 280/780, 775, 784; 180/232, 274, 280; 74/492, 493

[56] References Cited

U.S. PATENT DOCUMENTS

| | | | |
|---|---|---|---|
| 3,578,782 | 5/1971 | Miyoshi | 280/777 |
| 3,672,697 | 6/1972 | Knowles | 280/777 |
| 3,929,030 | 12/1975 | Sukeshita | 74/492 |
| 3,934,896 | 1/1976 | Barenyi | 280/777 |
| 4,411,167 | 10/1983 | Mohr | 280/777 |
| 4,655,475 | 4/1987 | Van Gelderen | 280/777 |

FOREIGN PATENT DOCUMENTS 2-34380  3/1990  Japan .
2-48478  4/1990  Japan .

*Primary Examiner*—Brian L. Johnson
*Assistant Examiner*—Peter C. English
*Attorney, Agent, or Firm*—Weiner, Carrier & Burt, P.C.; Joseph P. Carrier; Irving M. Weiner

[57] ABSTRACT

An upper supporting member for supporting an upper pin projecting upwardly from a steering gear box is supported on a rear subframe extending in back of the steering gear box. A lower supporting member for supporting a lower pin projecting downwardly from the steering gear box is supported on a front subframe extending between the lower supporting member and a rear surface of an engine in front of the steering gear box. An upper end of a pinion shaft extending upwardly from the steering gear box and a lower end of a steering shaft are interconnected by an intermediate shaft which is capable of being broken by a shear pin. Upon collision of the vehicle, the steering gear box can be turned or rotated forwardly relative to the supporting structure, whereby the steering wheel can be reliably moved forwardly, or released from the steering gear box to provide a secondary stroke.

18 Claims, 13 Drawing Sheets

ROTATABLE STEERING GEAR BOX AND COLLAPSIBLE STEERING COLUMN

BACKGROUND OF THE INVENTION

1. Field of the Invention

The present invention relates to a steering system for a vehicle, including a steering gear box disposed laterally of a vehicle body at a front portion thereof, and a steering wheel mounted at a rear end of a steering shaft which extends rearwardly and upwardly from an upper portion of the steering gear box.

2. Description of Relevant Art

There are such conventionally known steering systems for a vehicle, described in Japanese Utility Model Application Laid-Open Nos. 34380/90 and 48478/90, in which the steering wheel is moved forwardly of the vehicle body by utilizing the deformation of a strength member resulting from a collision of the vehicle.

The steering system disclosed in the former publication has a problem that if the amount of deformation of the strength member due to the collision is small, it is difficult to insure a sufficient amount of steering wheel movement forwardly of the vehicle. The steering system disclosed in the latter publication has a problem that an extremely large load is applied to a lower segment of the steering shaft abutting against a shaft receiving member and hence, it is necessary to increase the diameter of the lower segment, thereby causing an increase in weight. The steering system disclosed in the latter publication also has another problem that a large deformation of the strength member is required in order to move the steering wheel forwardly a sufficient amount.

SUMMARY OF THE INVENTION

Accordingly, it is an object of the present invention to provide a steering system for a vehicle, wherein the steering wheel can be reliably moved forwardly a sufficient amount in order to insure a time or space allowance permitting a seat belt or an air bag to sufficiently function upon collision of the vehicle, or wherein the steering wheel can be reliably allowed to secondarily stroke in order to absorb a secondary collision energy upon the collision of the vehicle.

To achieve the above object, according to the present invention, there is provided a steering system for a vehicle, comprising a steering gear box disposed laterally of a vehicle body at a front portion thereof, and a steering wheel mounted at a rear end of a steering shaft which extends rearwardly and upwardly from an upper portion of the steering gear box, wherein the steering gear box is turnably supported about a laterally extending axis, and the steering shaft is displaced forwardly by transmitting the rearward movement of a front vehicle body structure to the steering gear box by a transmitting member to turn the steering gear box about the axis.

With the above construction, when the front vehicle body structure is moved rearwardly upon collision of the vehicle, the steering gear box is immediately turned forwardly, and the steering shaft is drawn forwardly of the vehicle body. Thus, the steering wheel can be pulled forwardly of the vehicle body to insure a sufficient space in back of the steering wheel, or the steering wheel can be released from the steering gear box, so that the steering wheel can perform a secondary stroke for absorption of a shock.

The front vehicle body structure may be an engine disposed in front of the steering gear box. An upper supporting member for supporting an upper portion of the steering gear box may be connected to a rear vehicle body structure disposed in back of the steering gear box, and a lower supporting member for supporting a lower portion of the steering gear box may be connected to the transmitting member extending between the steering gear box and the engine. Thus, the steering gear box can be reliably turned forwardly by the retreat of the engine.

The front vehicle body structure may be a front sideframe, and an arm projecting downwardly from the steering gear box may be connected to the front side-frame by the transmitting member. Thus, the steering gear box can be reliably turned forwardly by the retreat of the front sideframe.

The front vehicle body structure may be an engine disposed in front of the steering gear box, and an arm projecting downwardly from the steering gear box may be connected to the engine by the transmitting member. Thus, the steering gear box can be reliably turned or rotated forwardly by the retreat of the engine.

The steering gear box and the steering shaft may be interconnected by an intermediate shaft which is capable of being broken by a tensile load. Thus, the intermediate shaft can be broken or severed by turning movement of the steering gear box to release the steering shaft and the steering wheel from the steering gear box, thereby permitting the steering shaft and the steering wheel to freely perform a secondary stroke for absorption of a shock.

The above and other objects, features and advantages of the invention will become apparent from the following description of the preferred embodiments taken in conjunction with the accompanying drawings.

DETAILED DESCRIPTION OF THE PREFERRED EMBODIMENTS

Figure 1:
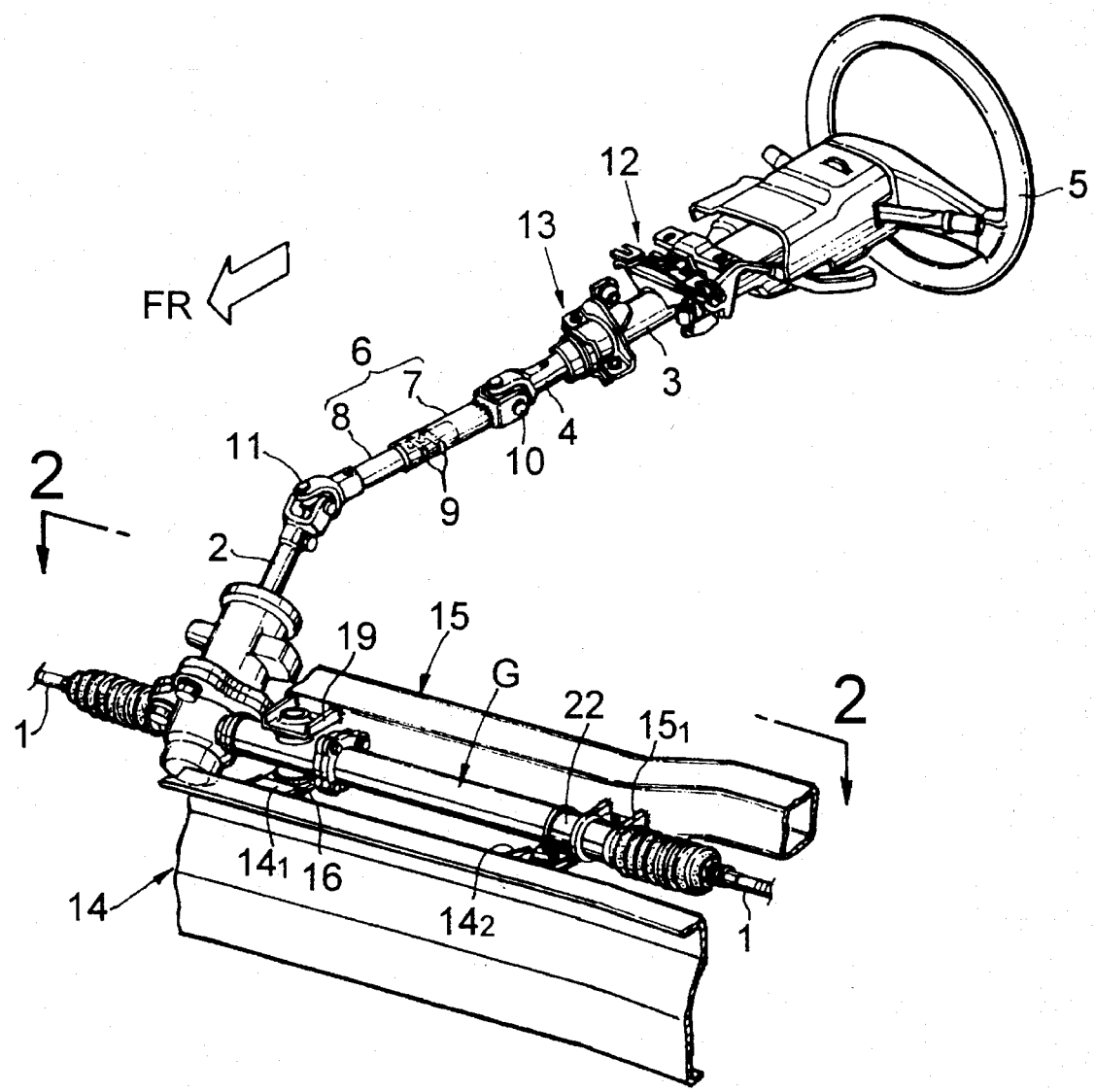
FIG. 1 is a perspective view of a steering system for a vehicle according to a first embodiment of the present invention.

A first embodiment of the present invention will now be described with reference to FIGS. 1 to 5.

A steering system for a vehicle includes a substantially cylindrical steering gear box G disposed laterally of a vehicle body in back of an engine E mounted at a front portion of the vehicle body. A rack R and a pinion P are meshed with each other within the steering gear box G. A pair of tie rods 1, 1 are connected to the rack R and extend to the outside through laterally opposite ends of the steering gear box G, and a pinion shaft 2 is connected to the pinion P and extends upwardly through a right end of the steering gear box G. The term "engine E" used herein is defined as including a transmission integral with the engine.

A steering shaft 4 is rotatably supported within a column tube 3 extending rearwardly and upwardly from a front and lower point in the vehicle body. The steering shaft 4 includes a steering wheel 5 at its rear end and is connected at its front end through an intermediate shaft 6 to an upper end of the pinion shaft 2. The intermediate shaft 6 is comprised of an outer shaft 7 and an inner shaft 8 coupled to each other by two shear pins 9, 9 which are capable of being broken by a tensile load such as occurs upon a collision of the vehicle. The outer shaft 7 is connected at its rear end to the steering shaft 4 through an upper joint 10 comprising a universal joint, and the inner shaft 8 is connected at its front end to the pinion shaft 2 through a lower joint 11 comprising a universal joint.

The column tube 3 is supported within an instrument panel (not shown) through two upper and lower shock absorbing brackets 12 and 13. The shock absorbing brackets 12 and 13 have a function to provide a predetermined slide resistance to the column tube 3 which secondarily strokes forwardly along with the steering wheel 5 and the steering shaft 4, and to absorb energy.

A front subframe 14 which is S-shaped in section is mounted between the steering gear box G and the engine E to extend laterally of the vehicle body, and a rear subframe 15 of a box-like shape in section is mounted in back of the steering gear box G to extend laterally of the vehicle body. According to this embodiment, the engine E constitutes a front vehicle body structure of the present invention, the rear subframe 15 constitutes a rear vehicle body structure of the present invention, and the front subframe 14 constitutes a transmitting member of the present invention.

A lower supporting member 16 extending rearwardly is bolted to a bracket $14_1$ welded to the front subframe 14. A lower pin 17 projects downwardly from a lower end face of a right side portion of the steering gear box G in the vicinity of a supported portion of the pinion shaft 2. The lower pin 17 is engaged in an engage hole $16_1$ defined in the lower supporting member 16 with a rubber bush 18 interposed therebetween. An upper pin 20 projects upwardly from an upper surface of the right portion of the steering gear box G and is engaged in an engage hole $19_1$ defined in an upper supporting member 19 with a rubber bush 21 interposed therebetween. The upper supporting member 19 is welded to the rear subframe 15 to extend forwardly.

A pair of brackets $14_2$ and $15_1$ opposed to each other are welded to left sides of the front subframe 14 and the rear subframe 15, respectively. The steering gear box G is turnably clamped at its left portion between a pair of upper and lower holders 22 and 23 bolted to the brackets $14_2$ and $15_1$, with a rubber bush 25 interposed between such left portion and the holders 22 and 23.

Figure 2:
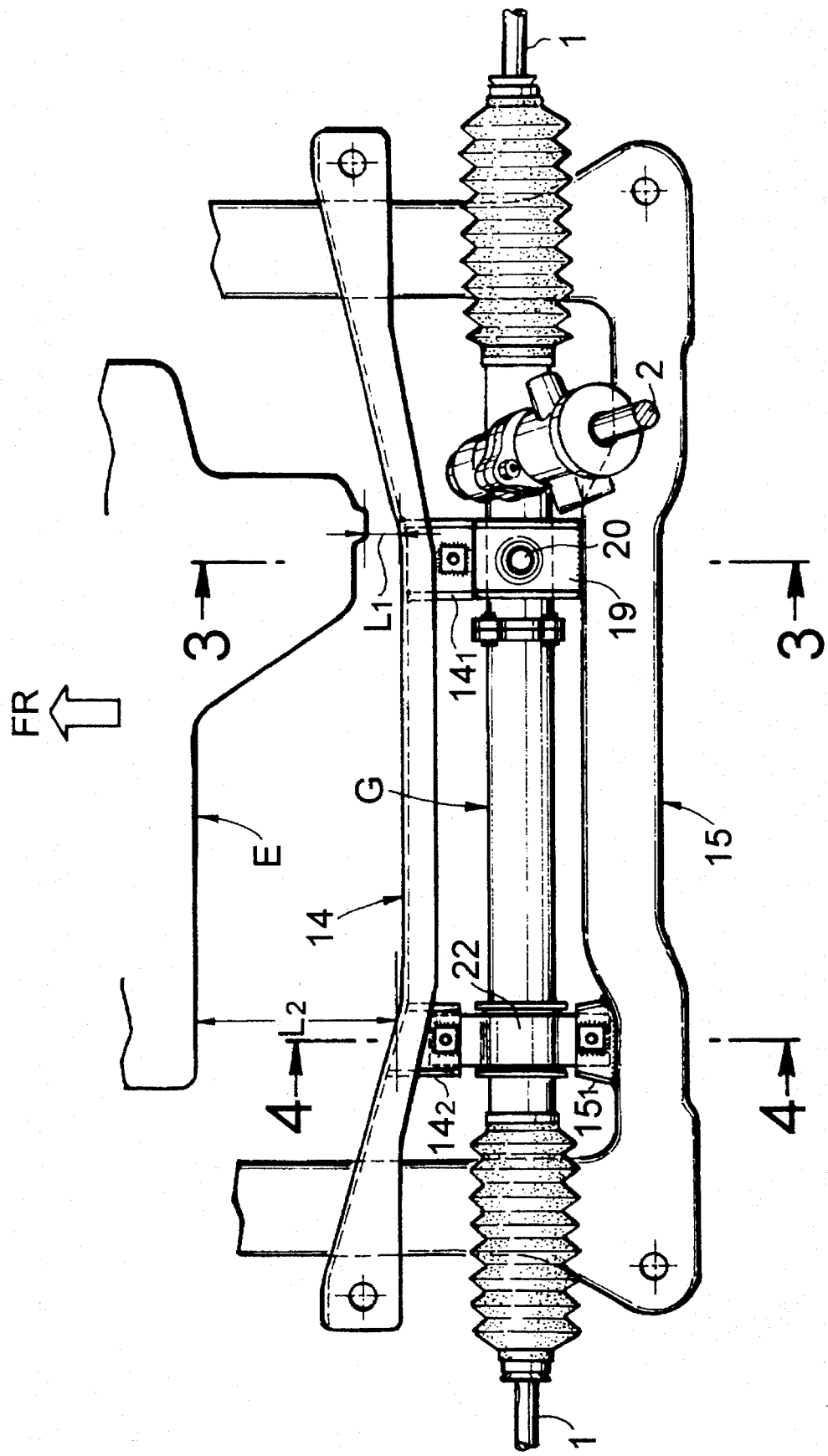
FIG. 2 is a view taken along line 2—2 in FIG. 1.
Figure 3:
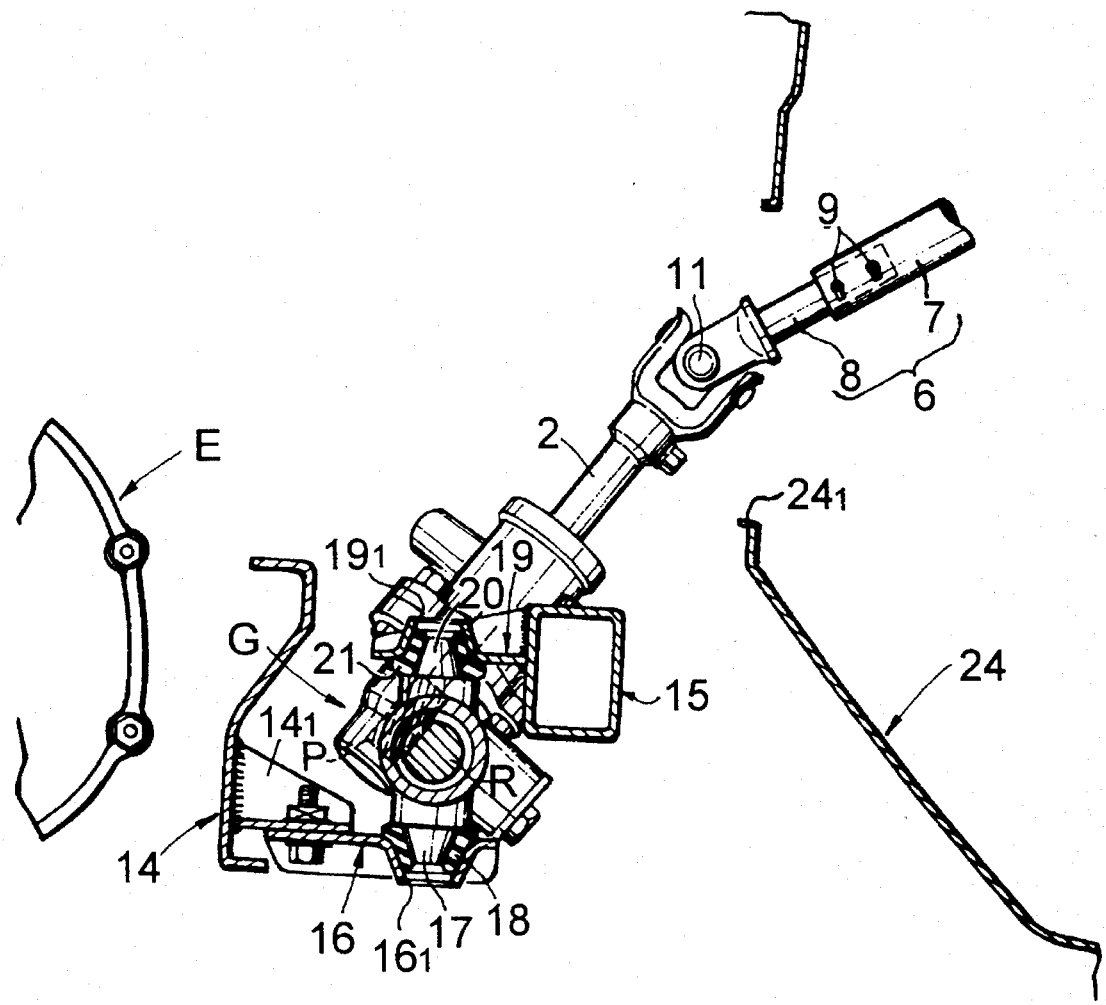
FIG. 3 is a sectional view taken along line 3—3 in FIG. 2.
Figure 4:
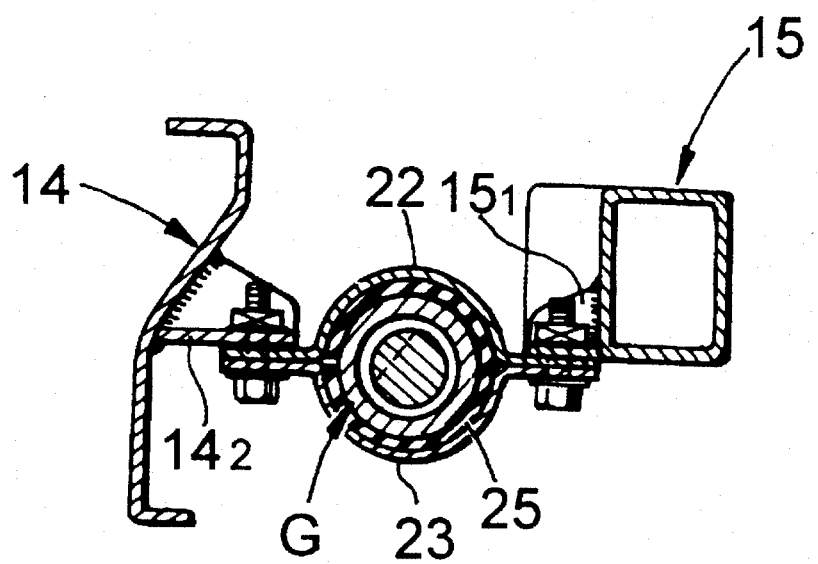
FIG. 4 is a sectional view taken along line 4—4 in FIG. 2.

As can be seen from FIGS. 2 and 3, the distance between a rear surface of the engine E and a front surface of the front subframe 14 assumes a minimum value $L_1$ in the vicinity of the lower supporting member 16, and assumes a value $L_2$ larger than the value $L_1$ in the vicinity of the holders 22 and 23.

The operation of the embodiment of the present invention having the above-described construction will be described below.

Figure 5:
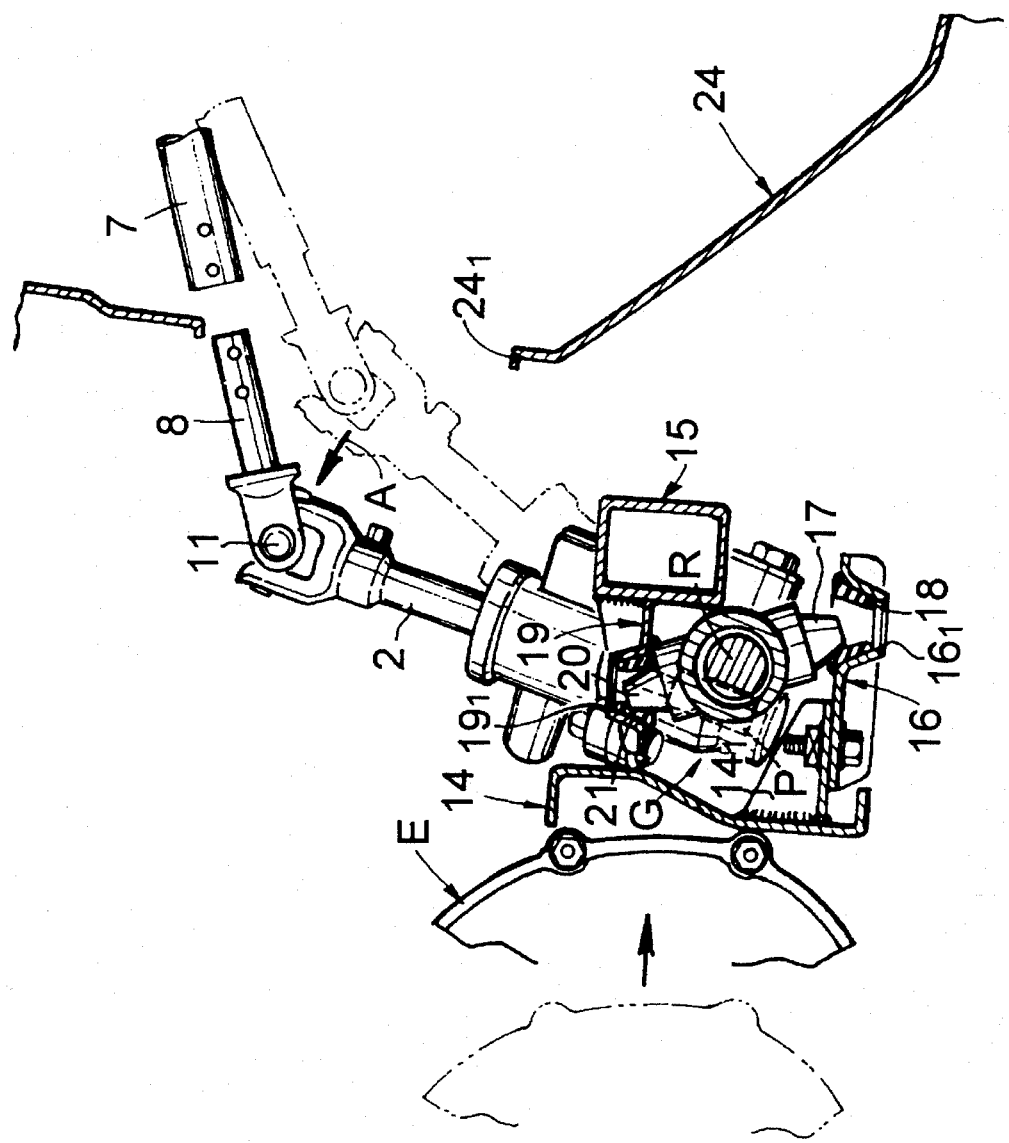
FIG. 5 is a view for explaining operations of the first embodiment.

As shown in FIG. 5, when the engine E is retreated upon collision of the vehicle, the front subframe 14 is deformed rearwardly by the impacting contact of the front subframe 14 with the rear surface of the engine E. At this time, the rear surface of the engine E is first brought into impacting contact with the front subframe 14 in the vicinity of the lower supporting member 16, where such the distance assumes the minimum value $L_1$ and hence, the impacting contact portion of the front subframe 14 is deformed rearwardly in a maximum amount.

When the front subframe 14 has been deformed rearwardly, the lower supporting member 16 integral with the front subframe 14 is moved rearwardly to urge the lower pin 17 of the steering gear box G rearwardly. The rear subframe 15 is in a position largely spaced apart rearwardly from the engine E and hence, even if the engine E is substantially retreated due to the collision of the vehicle, the rear subframe 15 is little deformed. Thus, the upper pin 20 of the steering gear box G supported on the rear subframe 15 through the upper supporting member 19 is retained at the same position before and after the collision of the vehicle.

As a result, the lower pin 17 of the steering gear box G is turned rearwardly about the upper pin 20. In other words, the upper portion of the steering gear box G is turned forwardly relative to the lower portion, and the upper end of the pinion shaft 2 extending upwardly from the steering gear box G is moved in a direction of an arrow A. During this time, the turning of the steering gear box G by the load of the collision is not obstructed by the mounting connections between the gear box and the vehicle body because the left portion of the steering gear box G is turnably supported by the holders 22 and 23.

As described above, the steering gear box G itself is rotated and hence, the amount of movement of the upper end of the pinion shaft 2 in the direction of the arrow A is extremely large. As a result, the shear pins 9, 9 of the intermediate shaft 6 are broken by the load, and the inner shaft 8 of the intermediate shaft 6 is withdrawn forwardly through an opening $24_1$ in a dash board panel 24. This causes the steering wheel 5, the steering shaft 4 and the column tube 3 to be released from the steering gear box G, whereby the steering wheel 5, the steering shaft 4 and the column tube 3 can secondarily stroke forwardly of the vehicle body without an influence of the steering gear box G. During this secondary stroking, energy is absorbed by the forward sliding movement of the column tube 3 relative to the shock absorbing brackets 12 and 13.

If the shear pins 9, 9 are not used in the steering system so that the intermediate shaft 6 is non-separable, the steering wheel 5, the steering shaft 4 and the column tube 3 are, drawn forwardly of the vehicle body by the turning of the steering gear box G, causing a sufficient space to be defined in back of the steering wheel 5. Thus, it is possible to insure a sufficient time or space allowance in order to hold back an occupant by a seat belt or an air bag in the event of a collision.

Figure 6:
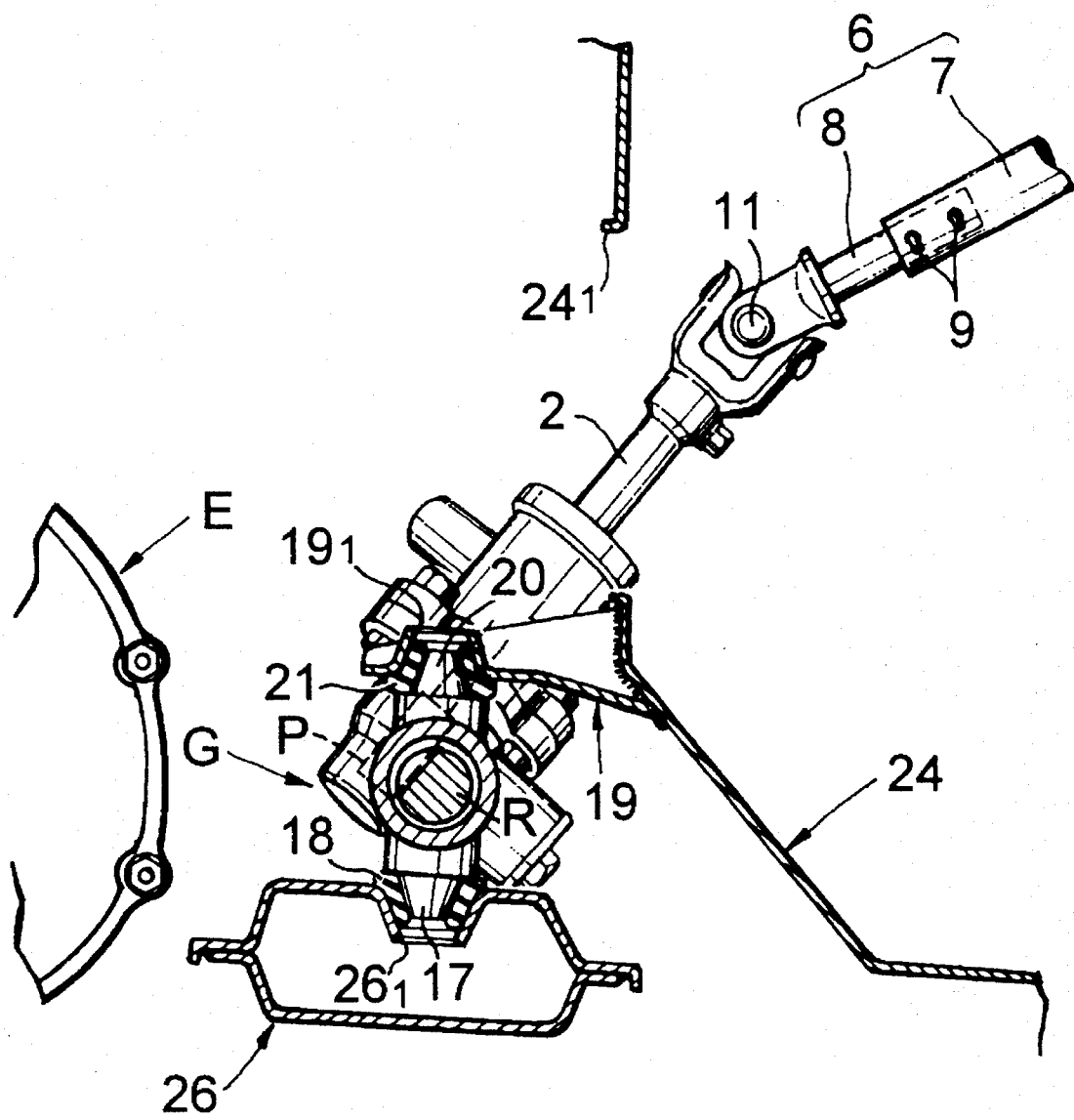
FIG. 6 is a partially sectional side view of a steering system for a vehicle according to a second embodiment of the present invention.
Figure 7:
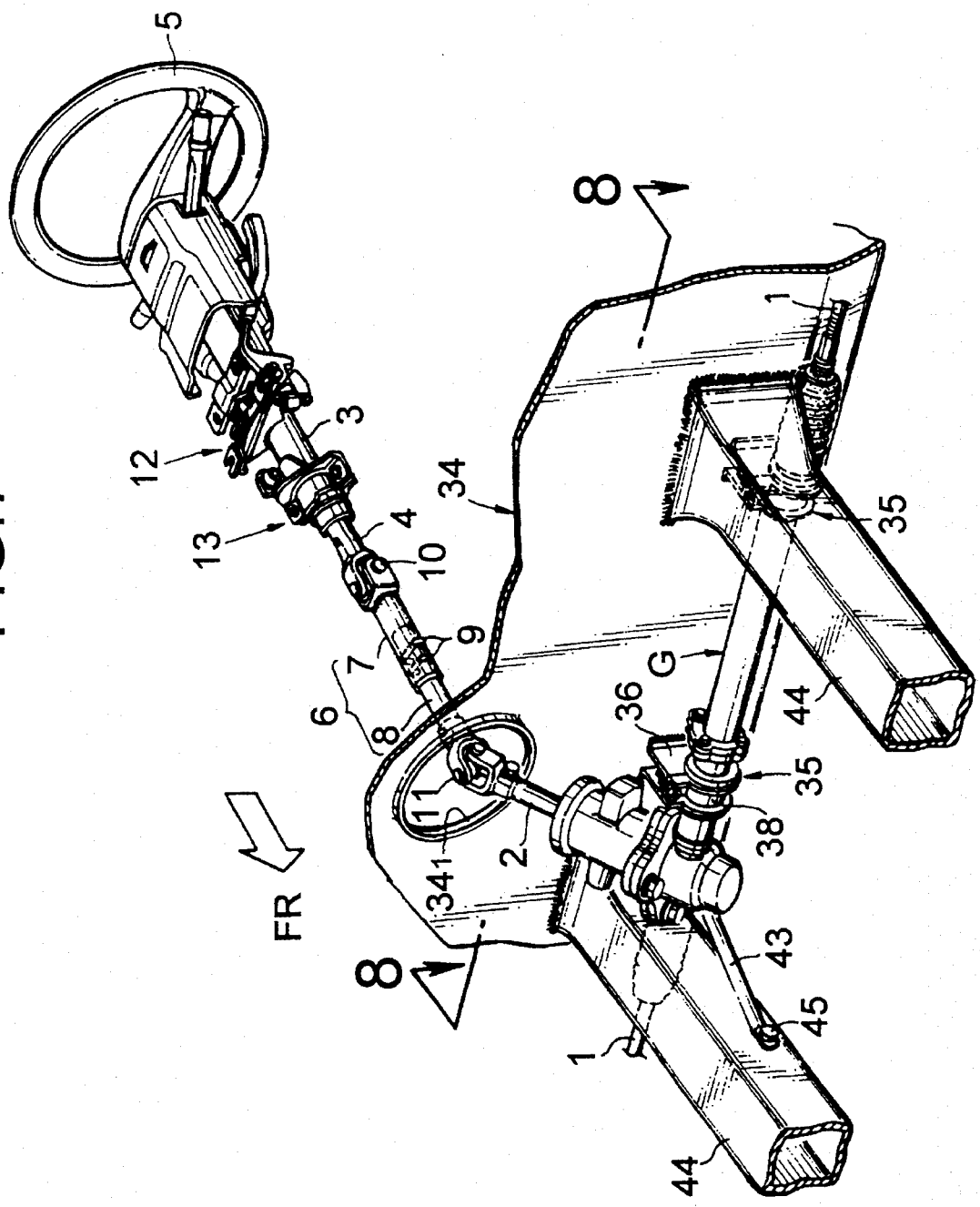
FIG. 7 is a perspective view of a steering system for a vehicle according to a third embodiment of the present invention.
Figure 8:
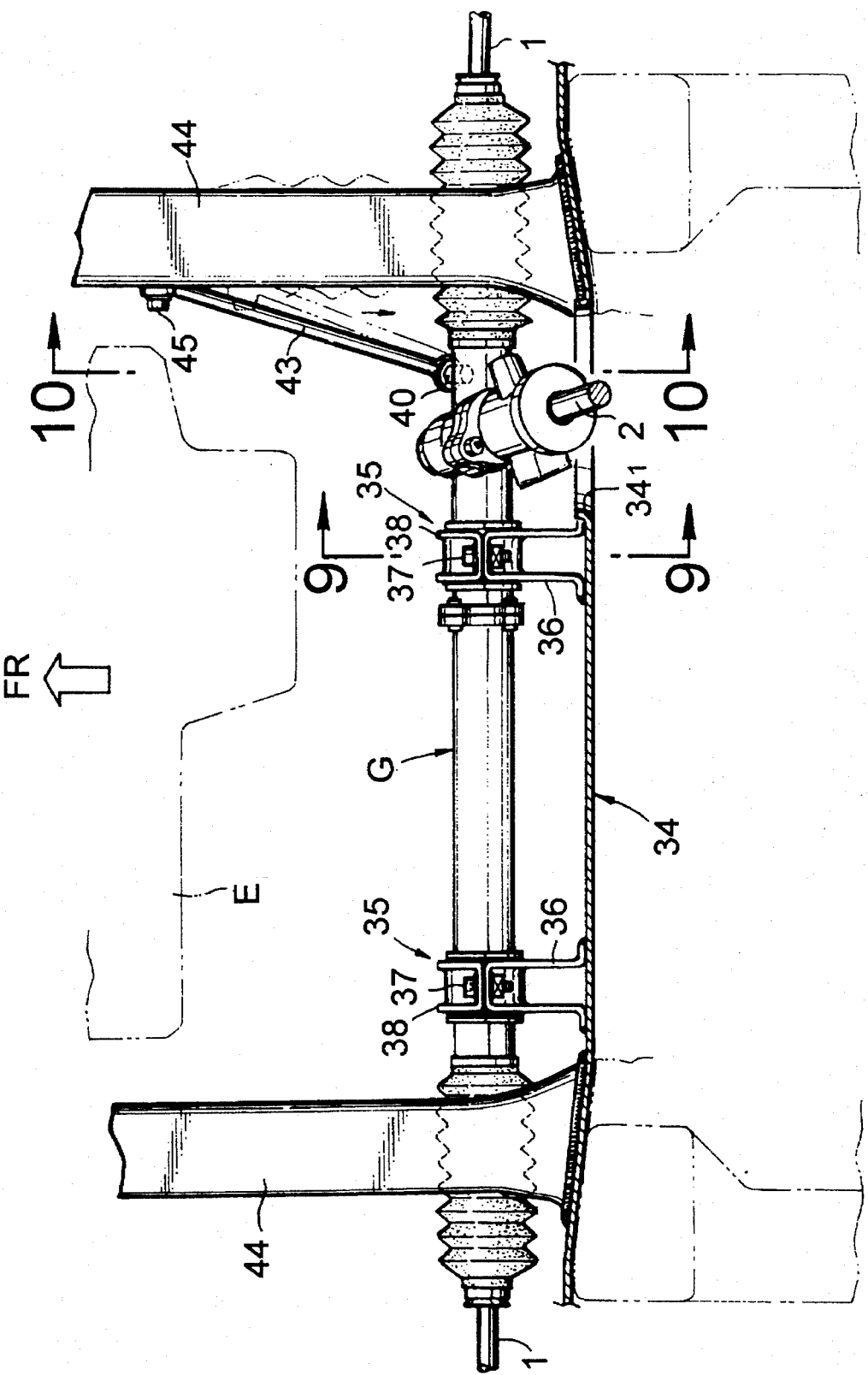
FIG. 8 is a view taken along line 8—8 in FIG. 7.
Figure 9:
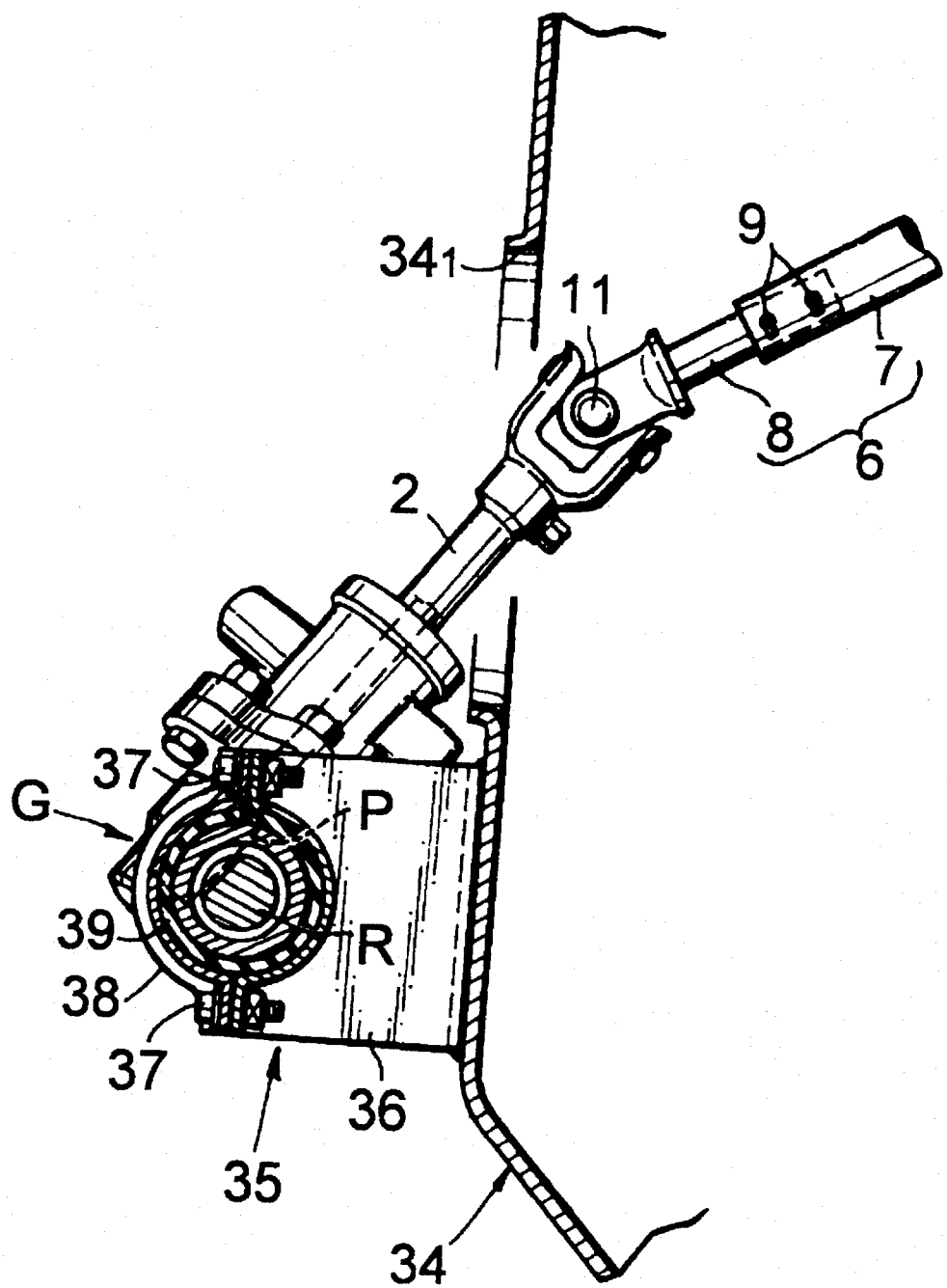
FIG. 9 is a sectional view taken along line 9—9 in FIG. 8.

A second embodiment of the present invention will now be described with reference to FIG. 6.

In the second embodiment, the rear subframe 15 used in the first embodiment is not provided to support the gearbox, and instead the upper supporting member 19 is fixed to a front surface of the dash board panel 24 serving as a rear vehicle body structure. A subframe 26 as a transmitting member taking the place of the front subframe 14 in the first embodiment is mounted along the lower portion of the steering gear box G, and the lower pin 17 of the steering gear box G is engaged in an engage hole $26_1$ defined in an upper surface of the subframe 26, with a rubber bush 18 interposed therebetween.

A front edge of the subframe 26 is located between the front surface of the steering gear box G and the rear surface of the engine E. When the engine E is retreated by a shock of collision of the vehicle, the rear surface of the engine E is first brought into impacting contact with the front edge of the subframe 26 in the vicinity of the lower pin 17.

The steering gear box G is turnably supported on the upper surface of the subframe 26 or on the front surface of the dash board panel 24 at a location spaced apart leftwardly of the vehicle body from the pinion shaft 2.

According to operation of the second embodiment, the upper portion of the steering gear box G is turned forwardly relative to the lower portion by the retreat of the subframe 26 upon the collision of the vehicle and therefore, the shear pins 9, 9 can be broken to release the steering wheel 5, the steering shaft 4 and the column tube 3 from the steering gear box G similar to operation of the first embodiment. Thus, it is possible to easily determine the secondary stroking for absorption of a shock without any influences of the steering gear box G, the universal joints 10 and 11 and the like. In the case where the shear pins 9, 9 are not mounted, the steering wheel 5, the steering shaft 4 and the column tube 3 can be drawn forwardly of the vehicle body upon collision of the vehicle to insure a space permitting a seat belt or an air bag to sufficiently function, between an occupant and the steering wheel 5.

A third embodiment of the present invention will now be described with reference to FIGS. 7 to 11.

The steering gear box G is longitudinally turnably supported by a pair of left and right steering gear box supporting means 35, 35 mounted on a front surface of a dash board panel 34. More specifically, each of steering gear box supporting means 35, 35 includes a mounting bracket 36 welded to the front surface of the dash board panel 34, and a cap 38 coupled to a front surface of the mounting bracket 36 by bolts 37. The steering gear box G is longitudinally turnably retained on circular openings defined between the mounting brackets 36 and the caps 38, with rubber bushes 39 interposed between the steering gear box G and the circular openings.

An arm 40 is projectingly provided in a downwardly turned attitude on a lower surface of the steering gear box G at its right end in the vicinity of the pinion shaft 2. A connecting member 43 (which constitutes a transmitting member of the invention) is supported at one end thereof on a rubber bush 42 fixed to a lower end of the arm 40 by a nut 41 and is coupled at the other end thereof by a bolt 45 to a right front side-frame 44 (which constitutes a front vehicle body structure of the present invention according to this embodiment) extending forwardly of the vehicle body from the dash board panel 34. The angle of the pinion shaft 2 extending rearwardly and upwardly from the steering gear box G can be accurately angularly positioned by regulating the longitudinally turned position of the steering gear box G by the connecting member 43.

The operation of the embodiment of the present invention having the above-described construction will be described below.

Figure 10:
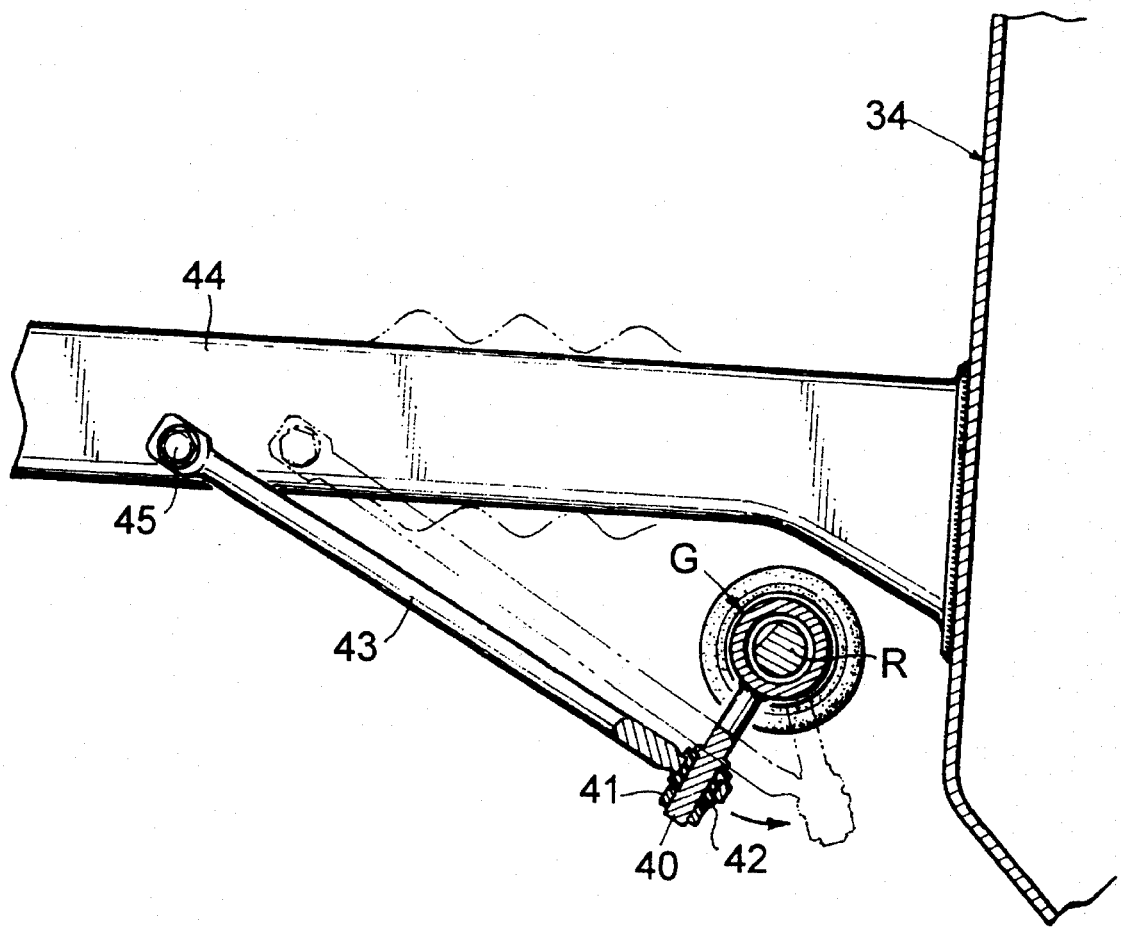
FIG. 10 is a sectional view taken along line 10—10 in FIG. 8.
Figure 11:
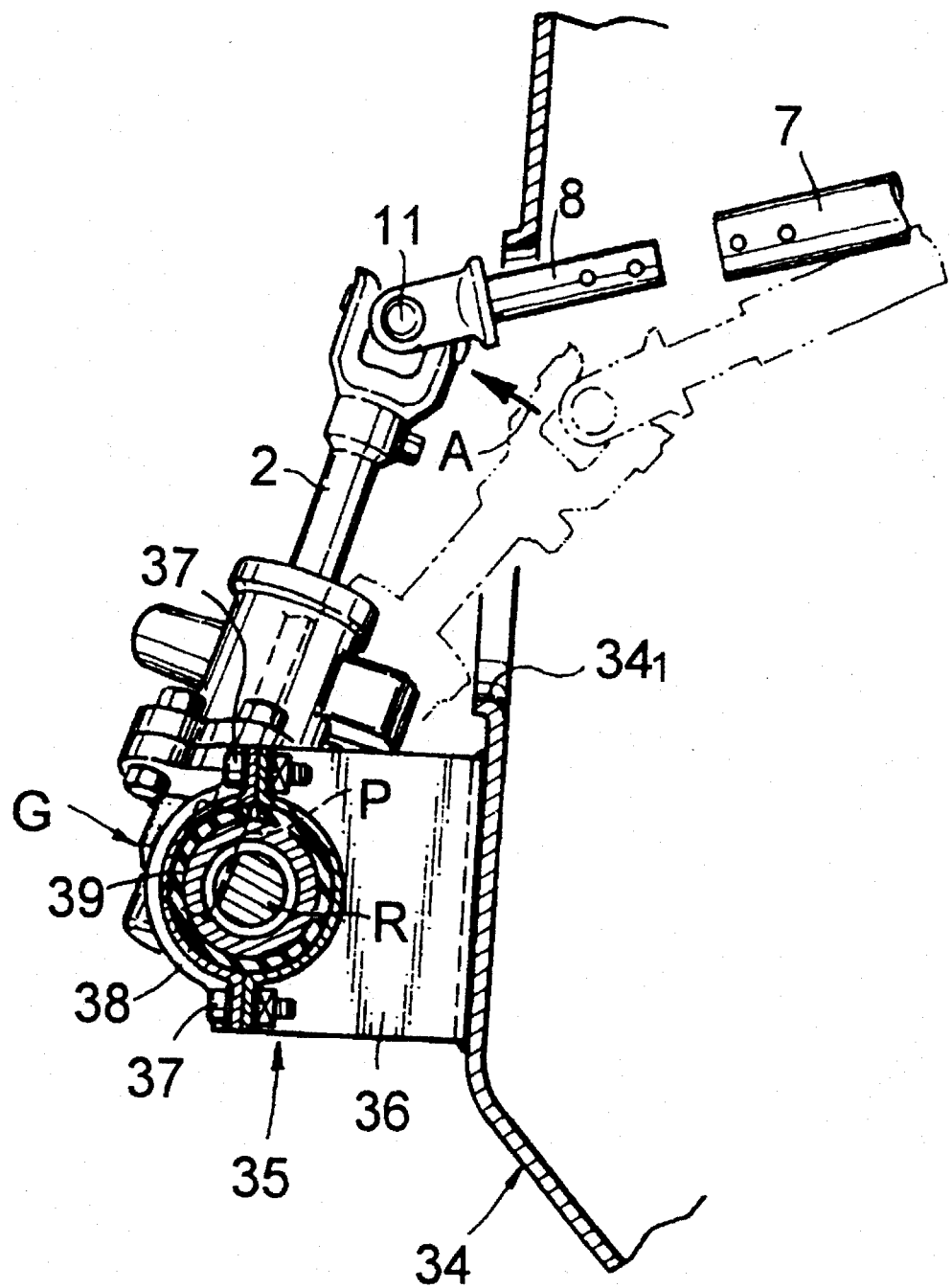
FIG. 11 is a view for explaining the operation of the system of FIG. 7.

As shown in FIG. 10, when the front side-frame 44 is deformed rearwardly by a shock provided from the forward portion of the vehicle upon collision of the vehicle, the lower end of the arm 40 is urged rearwardly by the connecting member 43, thereby turning the steering gear box G forwardly as supported on the left and right steering gear box supporting means 35, 35. As a result, the upper end of the pinion shaft 2 extending rearwardly and upwardly from the steering gear box G is moved in a direction of an arrow A, as shown in FIG. 11.

At this time, the steering gear box G itself is rotated and hence, the upper end of the pinion shaft 2 is largely moved in the direction of the arrow A. As a result, the shear pins 9, 9 of the intermediate shaft 6 are broken by a load, so that the inner shaft 8 of the intermediate shaft 6 is withdrawn through an opening $34_1$ in the dash board panel 34. This causes the steering wheel 5, the steering shaft 4 and the column tube 3 to be released from the steering gear box G, so that the steering wheel 5, the steering shaft 4 and the column tube 3 can secondarily stroke forwardly of the vehicle body without any influence of the steering gear box G. During this secondary stroking, an energy is absorbed by the forward sliding movement of the column tube 3 relative to the shock absorbing brackets 12 and 13.

As described above, the arm 40 extending downwardly from the steering gear box G and the front side-frame 44 are interconnected by the connecting member 43, so that the steering gear box G is turned in reaction to the deformation of the front side-frame 44. Therefore, it is possible not only to turn the steering gear box G without a time lag after the collision of the vehicle, but also to turn the steering gear box G even in a midship-engine vehicle or a rear-engine vehicle in which the engine E is not present in front of the steering gear box G.

In the case where the shear pins 9, 9 are not mounted, and the intermediate shaft 6 is non-separable, the steering wheel 5, the steering shaft 4 and the column tube 3 are drawn forwardly of the vehicle body by the turning movement of the steering gear box G, causing a sufficient space to be defined in back of the steering wheel 5. Thus, it is possible to insure a sufficient time or space allowance in the event of a collision in order to hold back an occupant by a seat belt or an air bag.

Figure 12:
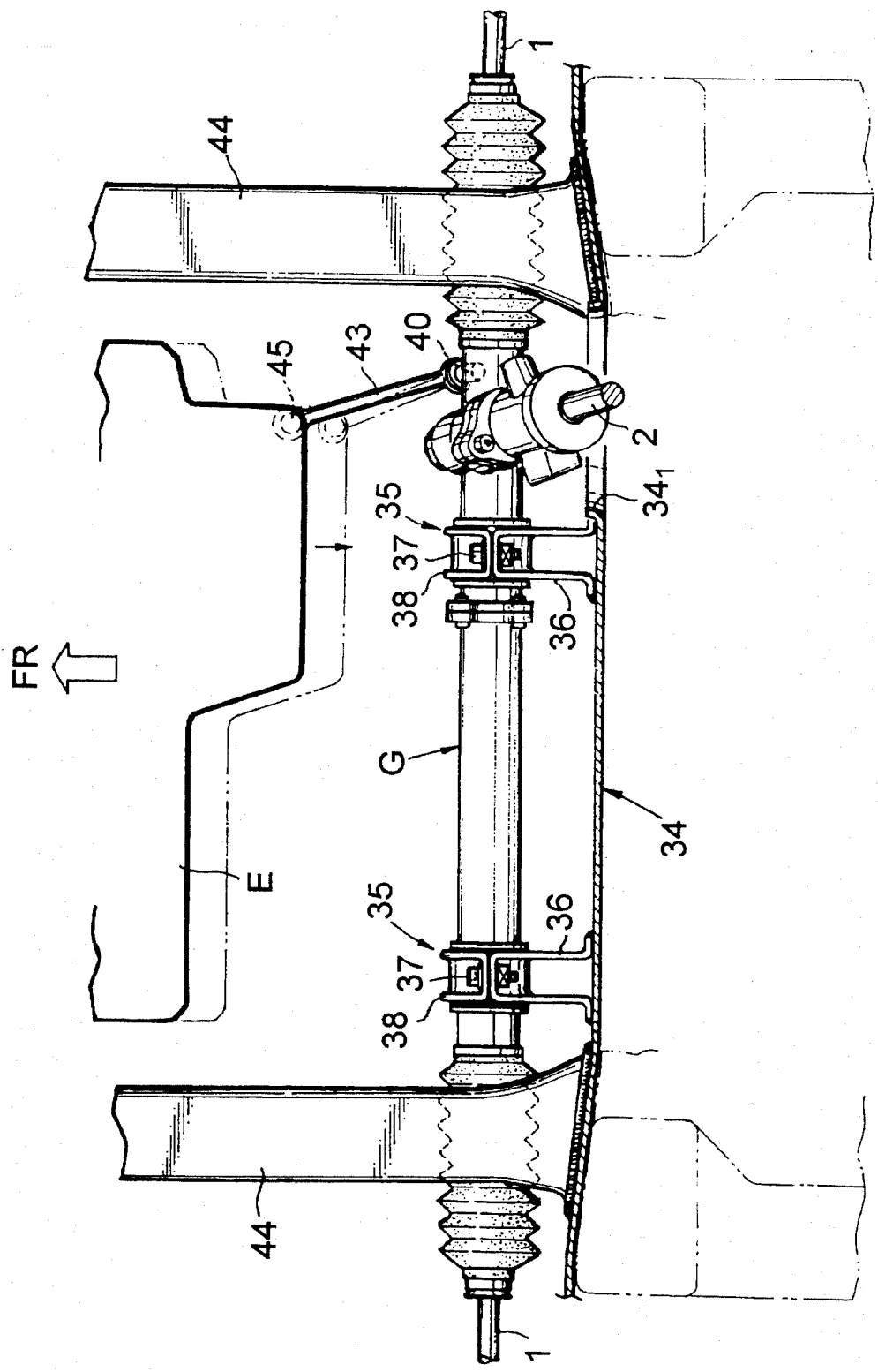
FIG. 12 is a view of a steering system for a vehicle according to a fourth embodiment of the present invention.

A fourth embodiment of the present invention will now be described with reference to FIG. 12.

In the fourth embodiment, an arm 40 projecting from the steering gear box G is connected to the rear portion of the engine E (which constitutes a front vehicle body structure of the present invention) by the connecting member 43. The term "engine E" used herein is defined as including a transmission integral with the engine E.

According to the fourth embodiment, when the engine E is retreated by a shock provided from the front of the vehicle upon collision, the lower end of the arm 40 is urged rearwardly by the connecting member 43, thereby turning the steering gear box G forwardly. In this case, the steering gear box G is turned as soon as the engine E is retreated and hence, the shear pins 9, 9 of the intermediate shaft 6 can be broken without a time lag, or the steering wheel 5, the steering shaft 4 and the column tube 3 can be forced to secondarily stroke forwardly of the vehicle body.

Figure 13:
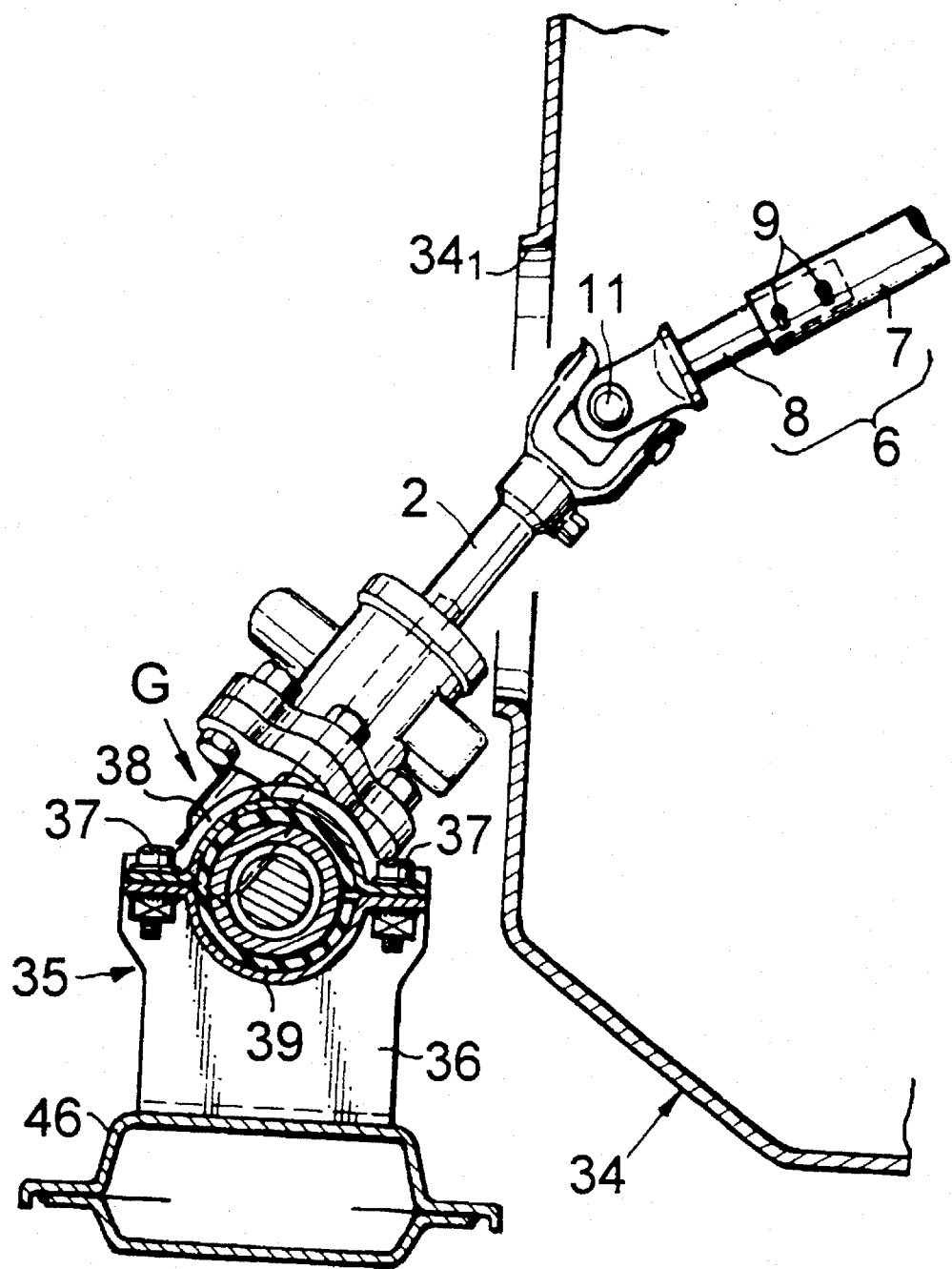
FIG. 13 is a view of a steering system for a vehicle according to a fifth embodiment of the present invention.

A fifth embodiment of the present invention will now be described with reference to FIG. 13.

In the fifth embodiment, the steering gear box supporting means 35, 35 for turnably supporting the steering gear box G are mounted on an upper surface of a subframe 46, in place of being mounted on the dash board 34.

According to the fifth embodiment, the steering gear box supporting means 35, 35 cannot be moved rearwardly by a rearward urging force of the connecting member 43 given the fact that the steering gear box supporting means 35, 35 are mounted on the subframe 46 having a rigidity higher than that of the dash board 34 and hence, the steering gear box G can be further reliably turned.

Although the preferred embodiments of the present invention have been described in detail above, it will be understood that the present invention is not limited to the above-described embodiments, and various modifications in design may be made without departing from the spirit and scope of the invention defined in claims.

For example, the front vehicle body structure may be a member other than the engine E and the front side-frame 44, and the transmitting member may be a member other than the front subframe 14, the subframe 26 and the connecting member 43. Further, the means for separating the intermediate shaft 6 is not limited to the shear pins 9, 9 and any other appropriate means can be employed.

What is claimed:

1. A steering system for a vehicle, comprising:

a steering gear box disposed laterally of a vehicle body at a front portion thereof, and a steering wheel mounted at a rear end of a steering shaft which extends rearwardly and upwardly from an upper portion of said steering gear box;

said steering gear box is turnably supported about a laterally extending axis thereof, a transmitting member extends between and operatively interconnects the steering gear box and a front vehicle body structure, and said steering shaft is displaced forwardly by transmitting rearward movement of said front vehicle body structure to said steering gear box by said transmitting member to turn said steering gear box about said axis.

2. A steering system for a vehicle according to claim 1, wherein said front vehicle body structure is a front side-frame, and said steering system further includes an arm projecting downwardly from said steering gear box, said arm being connected to said front side-frame by said transmitting member.

3. A steering system for a vehicle according to claim 1, wherein said front vehicle body structure is an engine disposed in front of said steering gear box, and said steering system further includes an arm projecting downwardly from said steering gear box and connected to said engine by said transmitting member.

4. A steering system for a vehicle according to claim 1, wherein said steering gear box and said steering shaft are interconnected by an intermediate shaft which is adapted to be broken by a tensile load.

5. A steering system for a vehicle according to claim 1, wherein said steering gear box has a rigid member projecting therefrom, and said transmitting member is operatively connected to a projecting end of said rigid member.

6. A steering system for a vehicle according to claim 5, wherein said rigid member projects from said steering gear box in a vicinity of said steering shaft.

7. A steering system for a vehicle according to claim 6, wherein said rigid member projects from a lower portion of said steering gear box disposed substantially opposite from said upper portion of the steering gear box from which the steering shaft extends.

8. A steering system for a vehicle according to claim 5, wherein said rigid member comprises a pin projecting downwardly from the steering gear box, and said transmitting member extends beneath said steering gear box to supportingly engage said pin.

9. A steering system for a vehicle according to claim 5, including support means for turnably supporting said steering gear box about said laterally extending axis, said support means being connected to a portion of said steering gear box longitudinally spaced from said rigid member.

10. A steering system for a vehicle, comprising:

a steering gear box disposed laterally of a vehicle body at a front portion thereof, and a steering wheel mounted at a rear end of a steering shaft which extends rearwardly and upwardly from an upper portion of said steering gear box;

said steering gear box is turnably supported about a laterally extending axis, a transmitting member extends between and operatively interconnects the steering gear box and a front vehicle body structure, and said steering shaft is displaced forwardly by transmitting rearward movement of said front vehicle body structure to said steering gear box by said transmitting member to turn said steering gear box about said axis; and said front vehicle body structure is an engine disposed in front of said steering gear box, and said steering system further includes an upper supporting member supporting an upper portion of the steering gear box, said upper supporting member being connected to a rear vehicle body structure disposed in back of said steering gear box, and a lower supporting member supporting a lower portion of the steering gear box, said lower supporting member being connected to said transmitting member extending between said steering gear box and said engine.

11. A steering system for a vehicle, comprising:

a steering gear box disposed laterally of a vehicle body at a front portion thereof;

a steering wheel mounted at a rear end of a steering shaft which extends rearwardly and upwardly from an upper portion of said steering gear box;

means for stably supporting said gear box at the front portion of the vehicle body such that it is turnable about a longitudinal axis thereof;

means for turning said gear box about said longitudinal axis when the front portion of the vehicle body is subjected to a collision, said turning means being operatively connected to said gear box in a vicinity of said steering shaft; and said turning means comprises a transmitting member disposed forwardly of the steering gear box and operatively connected thereto.

12. A steering system for a vehicle according to claim 11, wherein said transmitting member extends between and operatively connects the gear box to an engine disposed in front of said steering gear box, said supporting means comprises an upper supporting member for supporting an upper portion of the steering gear box and connected to a rear body structure disposed in back of said steering gear box, and a lower supporting member for supporting a lower portion of the steering gear box and connected to said transmitting member extending between said steering gear box and said engine.

13. A steering system for a vehicle according to claim 11, wherein said transmitting member extends between and operatively connects the gear box to a front side-frame, said turning means further includes a rigid member projecting downwardly from said steering gear box, and a projecting end of said rigid member being operatively connected to said transmitting member.

14. A steering system for a vehicle according to claim 11, wherein said transmitting member extends between and operatively connects the gear box to an engine disposed in front of said gear box, said turning means further includes a rigid member projecting downwardly from the steering gear box and said transmitting member is disposed between said engine and said rigid member.

15. A steering system according to claim 14, wherein said transmitting member interconnects the engine and the rigid member.

16. A steering system for a vehicle according to claim 11, wherein said steering gear box and said steering shaft are interconnected by an intermediate shaft which is adapted to be broken by a tensile load to release the steering shaft and said steering wheel from the gear box.

17. A steering system for a vehicle according to claim 11, wherein said turning means comprises a rigid member which projects from said steering gear box in the vicinity of said steering shaft.

18. A steering system for a vehicle according to claim 17, wherein said rigid member projects from a lower portion of said steering gear box disposed substantially opposite to said upper portion of the steering gear box from which said steering shaft extends.

* * * * *